Figure 1:
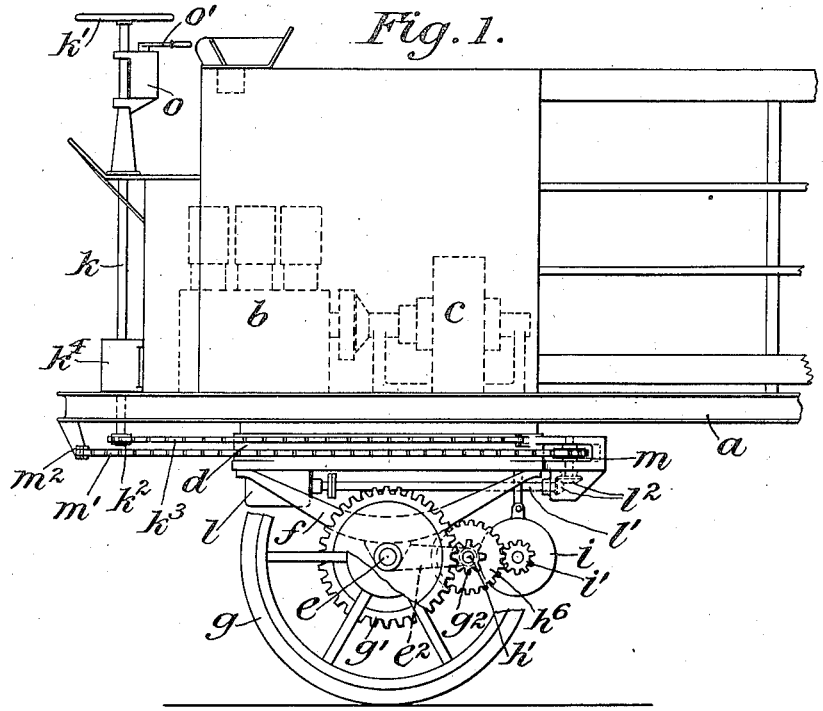

No. 803,008. PATENTED OCT. 31, 1905.
H. P. MOORREES.
MOTOR VEHICLE.
APPLICATION FILED OCT. 6, 1904.

3 SHEETS—SHEET 1.

Attest:
A. N. Jesbera.
M. A. Brayley

Inventor
Herman P. Moorrees
by Redding, Kiddle & Greeley
Attys.

No. 803,008. PATENTED OCT. 31, 1905.
H. P. MOORREES.
MOTOR VEHICLE.
APPLICATION FILED OCT. 6, 1904.

3 SHEETS—SHEET 2.

Attest:
A. N. Jesbera.
M. A. Brayley

Inventor:
Herman P. Moorrees
by Redding, Kiddle & Greeley
Attys.

No. 803,008. PATENTED OCT. 31, 1905.
H. P. MOORREES.
MOTOR VEHICLE.
APPLICATION FILED OCT. 6, 1904.

3 SHEETS—SHEET 3.

UNITED STATES PATENT OFFICE.

HERMAN P. MOORREES, OF NEW YORK, N. Y.

MOTOR-VEHICLE.

No. 803,008.  Specification of Letters Patent.  Patented Oct. 31, 1905.

Application filed October 6, 1904. Serial No. 227,336.

*To all whom it may concern:*

Be it known that I, HERMAN P. MOORREES, a subject of the Queen of Holland, residing in the borough of Brooklyn, city of New York, in the State of New York, have invented certain new and useful Improvements in Motor-Vehicles, of which the following is a specification, reference being had to the accompanying drawings, forming a part hereof.

This invention relates generally to the driving and steering mechanism of electrically-propelled motor-vehicles, and especially to vehicles of the class referred to in which both the driving arrangements and the steering arrangements are applied to the same truck, usually the forward truck, and in which the steering is effected by the swiveling of the steering-truck or its axle about a central vertical axis rather than by independent steering-wheels mounted at the ends of a fixed axle.

In accordance with the present invention means are provided for effecting by hand the necessary movement of the steering truck or axle to effect the deflection of the course of the vehicle to one side or the other. Electrically controlled or operated steering devices are also provided and may be employed independently of the hand-steering devices or in conjunction therewith to effect more rapidly the deflection of the course of the vehicle. To permit of the convenient application of the auxiliary or electrically-operated steering devices, the two wheels of the steering-truck are given or are permitted to have independence of motion upon their axes, being driven, preferably, by independent motors. Through the electrically-operated steering mechanism one of such motors is driven faster than the other motor, according to the direction in which the vehicle is to be turned, and the outside wheel is therefore driven faster than the inside wheel, whereby the action of the steering-motor is supplemented and the turning of the vehicle is effected more rapidly. Incidentally to the application of the improved steering devices the driving mechanism is likewise improved, although, as will be readily understood, the improved driving mechanism is capable of use independently of the improved steering mechanism and may be applied to a non-steering truck.

The invention will be more fully explained hereinafter with reference to the accompanying drawings, in which for purposes of explanation of its nature it is illustrated as embodied in a convenient and practical form, and in which—

Figure 2:
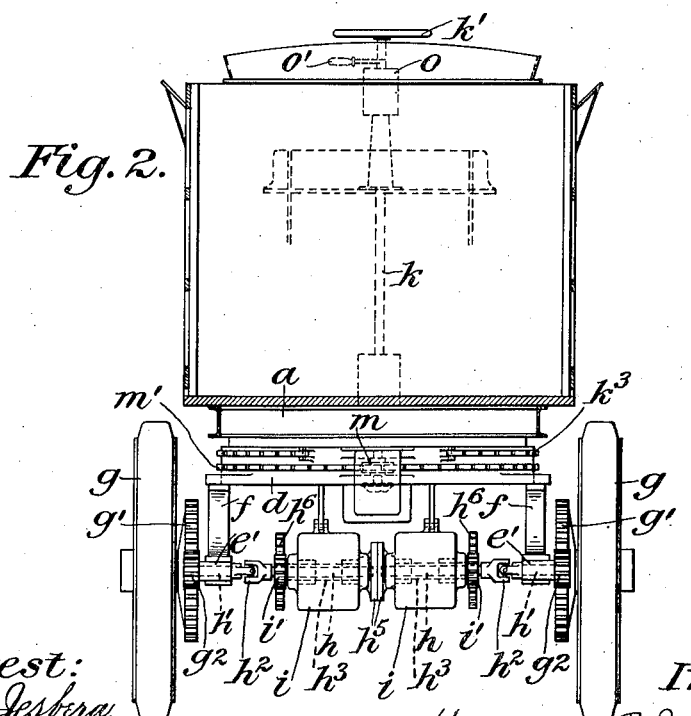
Figure 3:
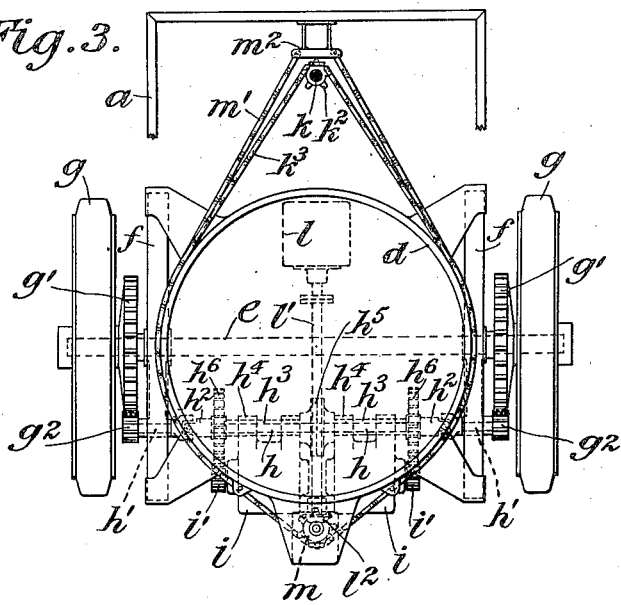
Figure 4:
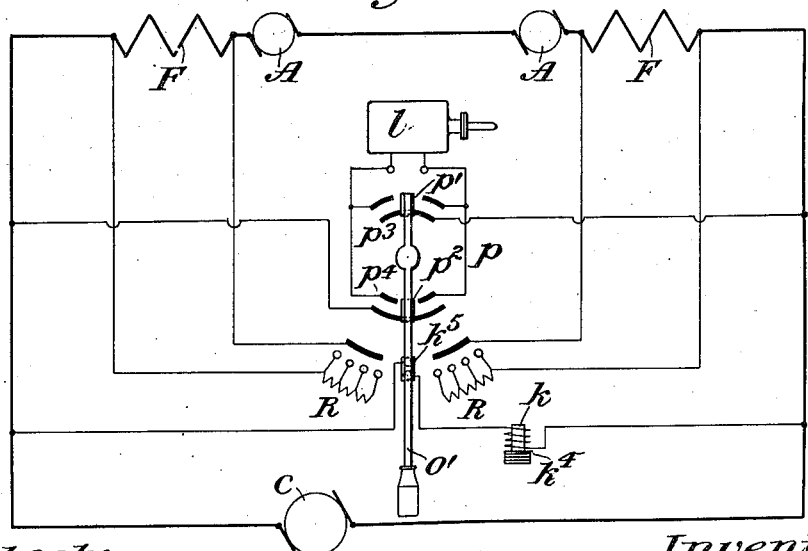
Figure 5:
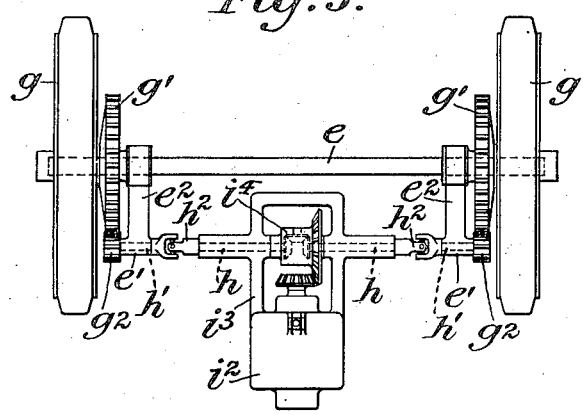

Figure 1 is a view in side elevation of the forward portion of a motor-vehicle to which the invention is applied. Fig. 2 is an end elevation of the parts shown in Fig. 1 looking from the rear, the body of the vehicle being shown in section. Fig. 3 is a plan view of the parts below the body of the vehicle, the steering shaft or pillar being shown in section and a portion of the frame of the vehicle being also represented. Fig. 4 is a diagram of the electrical connections involved in the operation of the electrical steering mechanism. Fig. 5 is a plan view of a modified form of the truck without the steering devices.

The vehicle to which the parts are applied may be of any desired character.

In the drawings the improvements are shown as applied to a heavy vehicle upon the frame $a$ of which may be mounted a prime motor $b$ and a dynamo $c$ as the source of supply of the current employed in the driving and the steering of the vehicle. The body of the vehicle rests upon a movable fifth-wheel $d$, constituting part of the truck-frame, to which the axle $e$, preferably non-rotary, may be connected in any convenient manner, as by the usual springs $f$. The driving and steering wheels $g$ may be mounted, as usual, upon the ends of the axle $e$ and are provided with driving-gears $g'$, engaged by driving-pinions $g^2$ on the outer ends of corresponding two-part counter-shafts $h\ h'$. The two parts of each counter-shaft are connected by a suitable universal joint $h^2$, and the outer part $h'$ of the shaft is mounted in a bearing $e'$, which is carried by an arm $e^2$, secured to or mounted upon the axle $e$. The other part $h$ of the shaft has a long bearing in a sleeve $h^3$, (shown in dotted lines in Figs. 2 and 3,) which is carried in short arms or bosses $h^4$, projecting from the casing of the motor $i$. The latter is suspended from a fixed portion of the frame, such as the fifth-wheel $d$. The two sleeves $h^3$ may be provided with flanges, as at $h^5$, and bolted together to further stiffen the structure, if desired. A gear $h^6$, mounted on the shaft $h$, meshes with a pinion $i'$ on the shaft of a corresponding motor $i$. The provision of a two-part transmission-shaft between the motor and the driving-wheel, with a universal joint interposed between the two parts and with the outer part supported in a bearing carried by the axle in close proximity to the driving-wheel, permits relative movement between the driving-wheel and the motor to be taken up by the universal joint without any tendency to cause binding between the pinion $g^2$ of the transmission-shaft and the driving-gear $g'$ on the driving-wheel $g$. The motor and one part of the counter-shaft, it will be observed, are supported from the truck-frame, and opportunity is given for the necessary reduction of speed between the motor and the driving-wheels, while the arrangement of gearing is such as not to be disturbed by the relative movement between the axle and the motor and is well adapted to withstand the strains to which it is subjected in use.

For the steering of the vehicle by hand there is provided a steering shaft or pillar $k$, having a hand-wheel or handle $k'$ in convenient proximity to the seat of the driver and at its lower end a sprocket-wheel $k^2$. The latter engages a chain $k^3$, the ends of which are secured to the movable fifth-wheel $d$, as shown in Fig. 2. The steering shaft or pillar $k$ is also provided with an electrically-controlled friction-check $k^4$ of ordinary construction for the purpose of preventing accidental deflection of the steering-wheels and the transmission of shocks to the hands of the driver. The construction of the check forms no part of the present invention; but, as indicated in Fig. 4 of the drawings, it may comprise an electromagnet in the circuit, as explained, and a series of disks, which are secured alternately to the shaft or pillar and the casing, (shown at $k^4$ in Fig. 1,) so that when the electromagnet is energized the disks are drawn together to increase the friction sufficiently to prevent the easy turning of the shaft, and when the magnet is deënergized the disks are released and the shaft can be turned freely. This construction is common and need not be illustrated in more detail than is already shown in the drawings.

For the operation of the auxiliary steering mechanism there is mounted on the truck-frame or fifth-wheel a steering-motor $l$, which is operatively connected by a shaft $l'$ and bevel-gears $l^2$ with a sprocket-wheel $m$, mounted in suitable bearings in the frame of the movable fifth-wheel. A chain $m'$ is engaged by the sprocket-wheel $m$ and has its ends secured to a fixed point of the vehicle-frame, as at $m^2$, so that when the sprocket-wheel is rotated by the motor it travels on the chain and swings the fifth-wheel in one direction or the other, according to the direction in which the motor $l$ is driven. For the purpose of determining the direction of rotation of the motor and the speed of rotation thereof a controller $o$ is mounted on the vehicle-frame, having a suitable handle $o'$ in convenient proximity to the driver's seat.

The arrangement of the controller and the connections to the steering-motor $l$ and to the driving-motors $i$, which assist the steering-motor, are shown in detail in Fig. 4 of the drawings, in which the generator $c$ or other source of electromotive force as represented as connected with the armatures A and fields F of the two driving-motors.

The friction-check $k^4$ is shown as included in a shunt from the main line, such shunt being closed and the friction-check $k^4$ energized, when the controller-handle $o'$ is in its central position, by a circuit-making device of usual character, (represented at $k^5$.) So long as the vehicle is moving in a straight path, therefore, the friction-check is closed and movement of the steering mechanism from the central position is prevented or retarded, while the transmission of shocks to the hands of the driver is also prevented. As soon, however, as the controller-handle is moved from its central position in one direction or the other the friction-check is released, so that the steering mechanism can then be moved freely. The steering-motor $l$ is also included in a shunt from the main circuit through a reversing-switch $p$, which may be of ordinary construction and arrangement, as represented in Fig. 4 of the drawings, comprising contact-making devices $p'$ and $p^2$, carried by the controller-lever or some part connected therewith, and suitable contacts, as at $p^3$ and $p^4$. The movement of the controller-handle in one direction or the other therefore throws current on the steering-motor in one direction or the other, according to the direction in which the vehicle is to be turned, and through the described connections the fifth-wheel is turned in the proper direction. For the purpose of assisting the steering-motor and of hastening the turning of the vehicle the movement of the controller-handle is also made use of to increase the speed of rotation of one or the other of the driving-motors $i$, as the case may be. To this end a shunt around the field F of each motor is made to include a variable resistance R, the terminals of which are arranged as usual, circuit being closed across the terminals by the contact-strip $k^5$, carried by the controller-handle or by any other contact device conveniently arranged. When the controller-handle is in its middle position, the shunts including each of the resistances are open and full current flows through the fields of both motors; but if the controller-lever is moved to one side, as to the left in Fig. 4, the corresponding shunt is closed with at first the full resistance, whereby a small portion of the current flows over the shunt, the field is correspondingly weakened, and the speed of the motor is correspondingly increased. Further movement of the controller-handle to the left successively reduces the resistance, correspondingly reduces the current in the field of the motor, and correspondingly increases the speed of the motor. The increase in speed of one motor over the other produces a corresponding increase in the speed of rotation of the corresponding driving-wheel, and this being always the outside driving-wheel the action of the steering-motor is supplemented and the turning of the vehicle is expedited.

In some cases it may be deemed unnecessary to make use of separate driving-motors for the purpose of assisting in the turning of the vehicle. As shown in Fig. 5 of the drawings, a single driving-motor $i^3$ may then be employed, the same being supported upon a suitable frame $l^3$ and operatively connected, through a differential gear $i^4$ of ordinary construction, with the two parts $h$ of the two-part counter-shafts, which are provided for the transmission of power to the different wheels $g$ of the vehicle.

Various other modifications of the details of construction and arrangement will readily suggest themselves as the conditions of each use may require, and it will be understood that the invention is not to be limited to the particular construction and arrangement shown and described herein.

I claim as my invention—

1. In a motor-vehicle, the combination of a steering shaft or pillar, steering mechanism operated thereby, an electrically-controlled friction-check coöperating with said shaft or pillar and comprising an electromagnet and parts directly acted upon thereby to vary the frictional contact thereof, and means to open and close said friction-check, substantially as described.

2. In a motor-vehicle, the combination of a steering shaft or pillar, steering mechanism operated thereby, an electrically-controlled friction-check coöperating with said shaft or pillar, a steering-motor operatively connected with said steering mechanism and means to control said motor and simultaneously open and close said friction-check, substantially as described.

3. In a motor-vehicle, the combination of a steering shaft or pillar, steering mechanism operated thereby, an electrically-controlled friction-check coöperating with said shaft or pillar, a steering-motor operatively connected with said steering mechanism, and a controller and electrical connections to said check and motor, including a reversing-switch for said motor, whereby the check is opened as the controller is operated to start the motor in one direction or the other, substantially as described.

4. In a motor-vehicle, the combination of a steering shaft or pillar, steering mechanism operated thereby, an electrically-controlled friction-check coöperating with said shaft or pillar, a steering-truck having independent driving-wheels, independent motors for said driving-wheels respectively, and means to vary the relative speeds of said motors and simultaneously open or close said check, substantially as described.

5. In a motor-vehicle, the combination of a steering shaft or pillar, steering mechanism operated thereby, an electrically-controlled friction-check coöperating with said shaft or pillar, a steering-truck having independent driving-wheels, independent motors for said driving-wheels respectively, and a controller and electrical connections with said check and with said motors whereby the relative speeds of the motors may be varied and the check opened or closed, substantially as described.

6. In a motor-vehicle, the combination of a steering-truck, a steering-motor mounted thereon, operative connections between the motor and the vehicle-body whereby the steering-truck is turned by the movement of the motor, a steering shaft or pillar mounted on the vehicle-body and operative connections between said shaft or pillar and said steering-truck, substantially as described.

7. In a motor-vehicle, the combination of a steering-truck, a motor mounted on said steering-truck, a chain having its ends anchored upon the vehicle-body and engaged by said motor, and means to control said motor, substantially as described.

8. In a motor-vehicle, the combination of a steering-truck, a steering-motor mounted on said steering-truck, a chain having its ends anchored upon the body of the vehicle and engaged by said motor, a steering shaft or pillar mounted on the vehicle-body and a chain having its ends anchored upon said steering-truck and operatively engaged by said shaft or pillar, substantially as described.

9. In a motor-vehicle, the combination of a steering-truck having independent driving-wheels, a steering-motor mounted on said truck, operative connections between the motor and the vehicle-body whereby the steering-truck is turned by the movement of the motor driving means for said wheels also mounted on said truck, and means carried by the vehicle-body to control said motor and said driving means, substantially as described.

10. In a motor-vehicle, the combination of a steering-truck, independent driving-wheels, a steering-motor operatively connected with said truck, independent motors geared to said driving-wheels respectively, and means to control said steering-motor and simultaneously to vary the speed of either of said driving-motors, substantially as described.

11. In a motor-vehicle, the combination of a truck, independent driving-wheels, a steering-motor operatively connected with said truck, independent driving-motors geared to said driving-wheels respectively, an electric circuit, including a generator and said driving-motors, normally open shunts around the field of said motors, a normally open shunt including said steering-motor and a reversing-switch, and a controller to close the circuit of the steering-motor and either of the shunts around the fields of the driving-motors, whereby the field of one of the driving-motors is weakened and the speed of such motor is increased simultaneously with the operation of the steering-motor, substantially as described.

12. In a motor-vehicle, the combination of a frame, an axle, driving-wheels, a motor supported by the truck-frame, a two-part counter-shaft comprising a universal joint and having one part supported with the motor-gearing between the motor and the counter-shaft, gearing between the counter-shaft and the wheels, and an arm secured to the axle adjacent to the wheel and wholly supporting the other part of the counter-shaft whereby said part is free to move with the axle and the mesh of said gearing is maintained without binding during bending of the axle, substantially as described.

This specification signed and witnessed this 3d day of October, A. D. 1904.

HERMAN P. MOORREES.

In presence of—
ANTHONY N. JESBERA,
MARY A. BRAYLEY.